Feb. 17, 1970　　　TAKASHI ENDO　　　3,496,371
APPARATUS FOR COMPARING SAMPLE DOCUMENT TO
STANDARD INCLUDING CORRELATION
Filed May 24, 1967　　　　　　　　　　　2 Sheets-Sheet 1

INVENTOR.
TAKASHI ENDO
BY
ATTORNEYS

Feb. 17, 1970　　　　　TAKASHI ENDO　　　　　3,496,371
APPARATUS FOR COMPARING SAMPLE DOCUMENT TO
STANDARD INCLUDING CORRELATION
Filed May 24, 1967　　　　　　　　　　　　　2 Sheets-Sheet 2

INVENTOR.
TAKASHI ENDO

BY
ATTORNEYS

United States Patent Office 3,496,371
Patented Feb. 17, 1970

3,496,371
APPARATUS FOR COMPARING SAMPLE DOCUMENT TO STANDARD INCLUDING CORRELATION
Takashi Endo, Kobe-shi, Japan, assignor to Mitsubishi Jukogyo Kabushiki Kaisha, Tokyo, Japan
Filed May 24, 1967, Ser. No. 640,867
Claims priority, application Japan, May 26, 1966, 41/33,701
Int. Cl. G01n 21/30; G01b 11/24
U.S. Cl. 250—219
11 Claims

ABSTRACT OF THE DISCLOSURE

In a method and apparatus for discriminating between genuine and counterfeit test articles, such as paper currency, the test article is scanned in synchronism with a genuine article. The test article is moved past a first scanning arrangement at a predetermined location along a first travel path, and the genuine article is moved, in synchronism with the test article, past a second scanning device located at the same point along a second travel path. The outputs of the scanning arrangements vary as functions of the scanning time. Correlator means are connected to the outputs of the scanning arrangements to derive the correlation function of these outputs. A comparison means is connected to the correlator means to determine whether the outputs of the scanning arrangements correspond or are disparate. For greater accuracy, the first scanning arrangement includes a first scanning device which is positioned correspondingly to a second scanning device forming part of the second scanning arrangement. The second arrangement includes a third scanning device spaced from the second scanning device. The outputs of the first and second scanning devices are connected to a first correlator, and the outputs of the first and third scanning devices are connected to a second correlator. In this case, the comparison means determines the difference between the outputs of the first and second correlators.

BACKGROUND OF THE INVENTION

The invention relates to a method of and apparatus for testing whether various printed articles, such as stocks, bonds, paper currency, and the like are genuine or counterfeit. The invention is particularly applicable to testing whether or not paper currency is genuine or counterfeit.

With the rising popularity of automatic vending machines, it has become increasingly necessary that an automatic vending machine should be useable not only with coins but also with paper currency. When an automatic vending device is designed to operate with paper currency as well as with coins, or even on paper currency alone, it has to be provided with a device for discriminating between genuine and counterfeit paper currency.

A conventional device for effecting such discrimination involves a base which is illuminated from above by a suitable light source and which has a plurality of photoelectric elements positioned on its bottom surface at predetermined locations selected in accordance with the particular paper currency to be tested. The piece of paper currency to be tested is placed on this base, being thus interposed between the light source and the photoelectric elements. The selected points at which the photoelectric elements are located are so chosen that, at some of these points, the paper currency should transmit only a minimum amount of light to the photoelectric elements and, at other points, the paper currency should transmit a maximum amount of light to the photoelectric elements. If the amount of light received by any of the photoelectric elements reaches a certain predetermined value, a relay or relays are actuated, and the actuation of the respective relays enables discrimination or testing of the piece of paper currency with respect to whether it is genuine or counterfeit.

Conventional testing devices of this type have several disadvantages. For example, the quantity of light transmitted through the test currency varies in accordance with the wear of the test paper currency, thereby decreasing the reliability of the testing. A false indication can also occur when the characteristics of the photoelectric elements are varied separately and independently, with the result that the device does not have stability of operation over a long time duration. Furthermore the output of any photoelectric elements will vary in accordance with variations in illumination of the light source, so that the operating levels of the relays change in accordance with changes in the illumination from the light source. This also causes false operation of the device. Another disadvantage is that a complicated mechanism is necessary to position the paper currency in a predetermined position on the base.

SUMMARY OF THE INVENTION

In accordance with the invention, the determination of whether a test piece of currency is genuine or counterfeit is effected by simultaneously scanning the test piece and a genuine piece of currency, with the scanning of the two pieces being effected in synchronism. Due to the variation of the printing pattern longitudinally of the currency, the variations of the pattern, during the longitudinal scanning of the two pieces of currency, occur as a function of the scanning time. With the invention method and apparatus, the variations, with respect to scanning time of the printing pattern of the test piece of currency are compared with the variations, with respect to the same scanning time, of the printing pattern of the genuine piece of currency. If the variations correspond, with respect to the scanning time, it is an indication that the test piece of currency is genuine. On the other hand, if the variations of the printing patterns are disparate with respect to scanning time, this is an indication that the test piece of currency is counterfeit.

In practicing the method of the invention, the apparatus used comprises first driving means for moving the test piece of currency past a first scanning point located at a predetermined location along the path of travel, and second driving means for drawing a genuine piece of currency past a second scanning means, located at a predetermined first location along the path of travel corresponding exactly to the location of the first scanning means, and past a third scanning means located at a different position along the path of travel. The outputs of the three scanning means are converted into electrical signals of a preselected polarity, and the signal corresponding to the first scanning means is compared with the signal corresponding to the second scanning means, in one correlator, and with the signal corresponding to the third scanning means, in a second correlator. The relative locations of the second and third scanning means are so selected that, if the printing patterns of the test piece of currency and the genuine piece of currency are identical, a peak signal will appear in the first correlator and a minimum signal appear in the second correlator. The outputs of the two correlators are compared in a discriminating device, and this discriminating device determines the difference between the two outputs. If this difference has at least a predetermined magnitude, the test piece of currency is genuine. On the other hand, if the difference has a magnitude substantially less than such predetermined magnitude, the test piece of currency is counterfeit.

An object of the present invention is to provide an improved method of and apparatus for determining whether a test article, having printing distributed in a predetermined pattern therealong, is genuine or is counterfeit.

Another object of the invention is to provide such a method and apparatus in which the testing or determination is effected by comparing the test article with a known genuine article.

A further object of the invention is to provide such a method and apparatus in which the test article and a genuine article are simultaneously scanned in synchronism with each other.

Yet, another object of the invention is to provide such a method and apparatus in which such scanning is used to detect variations in the printing patterns of the test and genuine articles as a function of the same scanning time, with the two variations being compared to determine whether the same correspond, to indicate that the test article is genuine, or are disparate, to indicate that the test article is counterfeit.

A further object of the invention is to provide such a method and apparatus in which the scanning is effected by a light source and photoelectric means.

Still another object of the invention is to provide such a method and apparatus in which the test and genuine articles are printed with magnetic ink, and the scanning is effected by magnetic means.

A further object of the invention is to provide such a method and apparatus in which the simultaneous and synchronized scanning of the test article and the genuine article are effected using a correlation technique.

BRIEF DESCRIPTION OF THE DRAWINGS

For an understanding of the principles of the invention, reference is made to the following description of typical embodiments thereof as illustrated in the accompanying drawings.

In the drawings.

DESCRIPTION OF THE PREFERRED EMBODIMENTS

Figure 1:
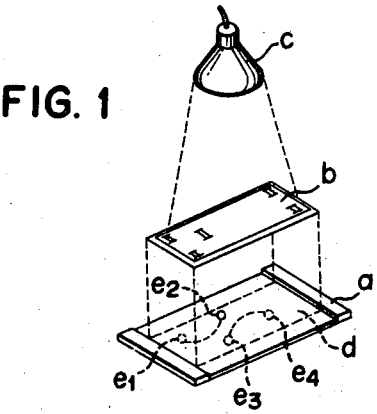
FIG. 1 is an exploded perspective view illustrating a known apparatus for testing whether an article, such as a security or paper currency, is genuine or counterfeit.

FIG. 1 illustrates a prior art arrangement for testing whether a piece of currency is genuine or counterfeit. Referring to FIG. 1, a paper currency $b$ is placed on a base $a$ and illuminated by a light source $c$, arranged above the paper currency. A plurality of photoelectric elements are positioned on a lower surface $d$ of base $a$ in such a manner that several points of the paper currency $b$ are selected in accordance with the relative transparence or translucence of the paper currency. For example, transparence or translucence is substantially low at the points $e1$ and $e2$, while it is markedly high at the points $e3$ and $e4$, and the photoelectric elements are positioned in accordance with these points.

With this arrangement, when the paper currency $b$ is illuminated by light source $c$, and when the quantity of light incident on the photoelectric elements located at points $e1$–$e4$ reaches a certain predetermined value, respective relays connected to the photoelectric elements are actuated. Thereby, the paper currency is tested with respect to whether it is genuine or counterfeit. The prior art arrangement shown in FIG. 1 has the disadvantages mentioned above.

Figure 2:
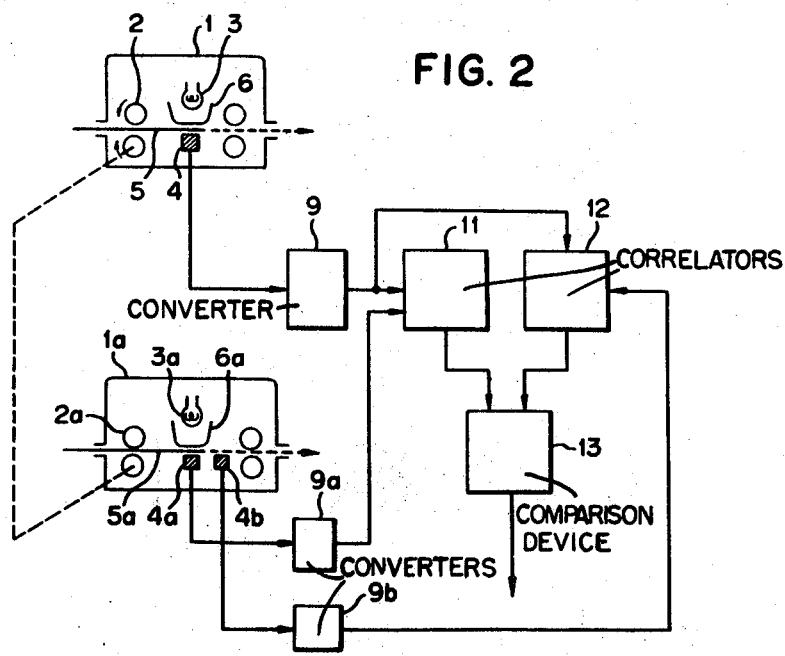
FIG. 2 is a schematic block diagram illustrating the method and apparatus of the present invention.

Referring now to FIG. 2, a device for checking the genuiness of paper currency is illustrated at 1 as including feed rollers 2 driven at a constant speed or angular velocity by a synchronous motor (not shown). The paper currency, indicated at 5, travels longitudinally along a path of travel through the device 1 and in the direction of the arrow. At a predetermined location along the path of travel, a light source 3 is positioned adjacent one surface of the paper currency 5 and a photoelectric element 4 is positioned in alignment with light source 3 but adjacent the opposite surface of paper currency 5 so that the light incident upon photoelectric element 4 varies in accordance with the transparency or translucency of paper currency 5. During its passage past light source 3 and photoelectric element 4, paper currency 5 is guided by a guide plate 6.

A similar device $1a$ is provided in the invention arrangement and is arranged to scan a genuine paper currency. The device $1a$ includes feed rollers $2a$ which are driven in synchronism with the feed rollers 2 of the device 1. The synchronization of feed rollers 2 and $2a$ may be provided by directly mechanically interconnecting these feed rollers or by driving each set of feed rollers by a respective synchronous motor. The genuine paper currency is illustrated at $5a$ as following a longitudinal path of travel through the device $1a$. A light source $3a$ is provided in device $1a$, and in alignment with this light source there is a photoelectric element $4a$, the location of photoelectric element $4a$ along the path of travel of genuine paper currency $5a$ corresponding to the location photoelectric element 4 along the path of travel of the test paper currency 5. A second photoelectric element $4b$ is provided spaced somewhat from the element $4a$ and in light receiving relation with light source $3a$. During its passage past the light source $3a$, genuine paper currency $5a$ is guided by a guide plate $6a$.

Figure 3:
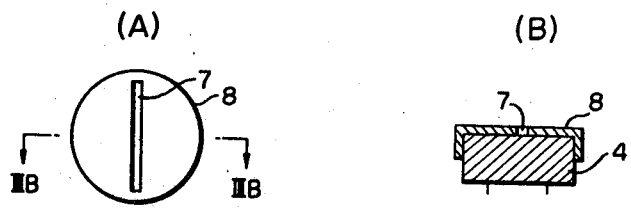
FIG. 3A is a plan view of a photoelectric element used in the arrangement of FIG. 2.
FIG. 3B is a section taken along the line IIIB—IIIB of FIG. 3A.

Referring to the FIGS. 3A and 3B, each of the photoelectric elements 4, $4a$ and $4b$ is covered by a respective cover plate 8 formed with a relatively narrow and elongated slit 7, slit 7 being narrow in the direction of travel of the paper currency and having its length extending transversely of such path of travels. Due to the printing patterns on the paper currencies 5 and $5a$, the outputs of the several photoelectric elements 4, $4a$ and $4b$ vary as a function of the scanning time of each paper currency. Thus, the outputs of the respective photoelectric elements fluctuate as a function of the scanning time.

Photoelectric element 4 is connected to the input of a device 9 which functions in such a manner that it receives a signal from photoelectric element 4, and corresponding to test paper currency 5, sets a suitable reference point, and converts only the A.C. component of the output of photoelectric element 4 into a signal of a predetermined polarity. By the A.C. component of the output of photoelectric element 4 is meant that portion of the output which varies above a predetermined threshold level of the output of photoelectric element 4. Devices similar to device 9 are provided at $9a$ and $9b$, with the device $9a$ being connected to the output of photoelectric element $4a$ and the device $9b$ being connected to the output of photoelectric element $4b$.

Polarity correlators are illustrated at 11 and 12, and a typical correlator of this type is disclosed, for example, in the article "A New Method For Recording The Impulse Response of Linear Systems By Correlation Measurement," by Takashi Isobe and Tohru Idogawa, appearing in vol. 3, No. 12, for December 1964 of "Japanese Journal of Applied Physics."

The output signals of electric circuit devices 9 and $9a$ are applied to the inputs of correlator 11, which calculates the correlation between the two output signals. The output signals of electric circuit devices 9 and $9b$ are applied to the correlator 12, which calculates the correlation between these two signals. The outputs of correlators 11 and 12 are applied as inputs to a comparison device 13, for example, a signal subtraction device. Device 13 generates a predetermined discriminating signal when the difference between the respective calculated results of correlators 11 and 12 extends a predetermined magnitude.

The operation of the embodiment of the invention shown in FIG. 2 will now be described more specifically. Assuming that the discriminating or testing device of the invention is ready for operation, and that the test paper currency 5 is placed in the check signal generating device 1, the test paper currency 5 is fed along a path of travel by feed rollers 2 at a predetermined speed and is illuminated from above by light source 3. Photoelectric element 4 which is provided with a cover plate 8 having a slit 7 has incident thereupon only the light which penetrates through test paper currency 5 and enters through slit 7 of cover 8. Photoelectric element 4 thus generates a scanning signal, corresponding to the printing pattern on paper currency 5, as a check signal for the test paper currency 5.

At the same time, and in synchronism with the travel of test paper currency 5 through device 1, the genuine paper currency 5a is moved along a path of travel through model signal generating device 1a by feed rollers 2a. Photoelectric elements 4a and 4b have incident thereupon only the light penetrating through the genuine paper currency 5a, from light source 3, and passing through the slits 7 of the covers 8 of the photoelectric elements 4a and 4b. These photoelectric elements 4a and 4b thus have outputs fluctuating in accordance with the printing pattern on the genuine currency 5a, the variation in the output being a function of the scanning time.

Since photoelectric elements 4a and 4b are located at positions spaced longitudinally from each other, it will be understood that the fluctuating outputs of these two photoelectric elements, which have the same form, will be offset or staggered by a time difference therebetween.

The output signal of photoelectric element 4 of device 1 corresponds to the pattern of the printing on paper currency 5, and thus is very irregular and is, generally considered, a function of scanning time which corresponds to the movement of test paper currency 5. However, this irregular signal, with respect to its A.C. component, has an inherent regularity determined by a certain probability law corresponding to the pattern of the printing on test paper currency 5. Considered from this standpoint, the printing pattern of test paper currency 5 can be checked by detecting whether or not the output signal of photoelectric element 4 has such inherent regularity.

For this purpose, the present invention evaluates the cross-correlation function. Generally, the correlation function includes auto-correlation and cross-correlation. The auto-correlation is expressed by the equation:

$$\phi 11(\tau) = \lim_{T \to \infty} \frac{1}{2T} \int_{-T}^{+T} y_1(t) \cdot y_1(t-\tau) dt \quad (1)$$

The cross-correlation is expressed by the equation:

$$\phi 12(\tau) = \lim_{T \to \infty} \frac{1}{2T} \int_{-T}^{+T} y_1(t) \cdot y_2(t-\tau) dt \quad (2)$$

In both these equation, $y_1(t)$ and $y_2(t)$ are functions of time.

Figure 4:
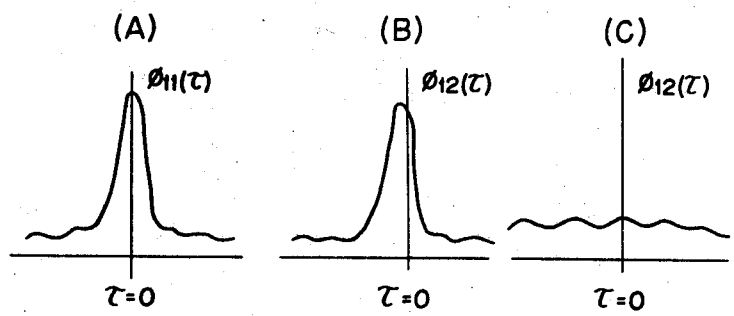
FIGS. 4A, 4B and 4C are diagrams graphically illustrating operation of the invention.

If the irregularities of the functions $y_1(t)$ and $y_2(t)$ have a large magnitude and are similar to each other, $\phi 11(\tau)$ and $\phi 12(\tau)$ will have the form shown in FIGS. 4A and 4B, wherein it will be noted that the maximum magnitudes occur in the vicinity of $\tau=0$. In other words, $\phi 11(\tau)$ will be a maximum at $\tau=0$. If there is no similarity between the irregularities of the functions, the function $\phi 12(\tau)$ will have the form shown in FIG. 4c, and there will be no peak value.

In the foregoing, the expression $\phi 11(\tau)$ is the output of correlator 11 and the expression $\phi 12(\tau)$ is the output of correlator 12. Thus, the maximum output of correlator 11 occurs when the two functions are similar to the point where they augment each other, and the same holds true with respect to the output of correlator 12. On the other hand, if the functions do not correspond to each other, they will not augment each other and therefore the output of correlator 12, at which this condition usually occurs, will be as shown in FIG. 4C.

In this embodiment of the invention, the check signal derived from photoelectric element 4 of signal generating device 1, and converted at electric circuit device 9 into a polarity signal comprising only an A.C. component, is designated $y_1(t)$, while the model signal provided from photoelectric element 4a of generating device 1a and converted at electric circuit device 9a into a polarity signal comprising only an A.C. component is designated $y_2(t)$. These two functions, $y_1(t)$ and $y_2(t)$ are impressed upon polarity correlator 11, in which the cross-correlation $\phi 12(\tau)$ is calculated. If there is a similarity between $y_1(t)$ and $y_2(t)$, the cross-correlation $\phi 12(\tau)$ has the shape appearing in FIG. 4B. In this function, one of the values of $\tau$, for example, the value at one point to be expressed by $\phi 12(\tau=0)$ is discriminated.

When the value at this point is impressed upon a suitable discriminating device and if the thus impressed value lies within a predetermined range of set values, it is ascertained that there is a similarity between the two signals. If the thus impressed value is not within such range, there is no similarity between the two signals. Thereby the genuineness of the test paper currency can be determined or discriminated.

In further accordance with the invention, and for the purpose of obtaining more accurate discrimination, the value at another point, in addition to the value at point $y_1(t)$ obtained in electric circuit device 9, is determined. Thus, a check signal $\Delta \tau$ is obtained from photoelectric element 4a of signal generating device 1a, and has a time difference of $4t$ with respect to the signal $y_2(t)$ obtained at the electric circuit device 9a. The signal at the output of photoelectric device 4b of generating device 1a is converted as to its polarity at electric circuit device 9b, so that the value $y_2(t-\Delta\tau)$ is obtained. When $y_1(t)$ and $y_2(t-\Delta\tau)$ are impressed upon polarity correlator 12, another cross-correlation $\phi 12(\tau)$ having a time difference of $\Delta\tau$ with respect to the cross-correlation $\phi 12(\tau)$, is calculated. In this case, if $\phi 12(\tau)$ at correlator 11 is $\phi 12(\tau=0)$, the value of one point to be expressed by $\phi 12(\tau=\Delta\tau)$, with respect to polarity correlation at polarity correlator 12, is discriminated or determined.

The value calculated at correlator 11, for example, $\phi 12(\tau=0)$, and the value calculated at correlator 12, for example, $\phi 12(\tau=\Delta\tau)$ are impressed upon the subtraction device 13. Thus, when the difference between the magnitudes of the two calculated values exceeds a certain value, device 13 delivers an output signal indicating that the test paper currency 5 is genuine. In other words, if test paper currency 5 is genuine, a peak value occurs at $\phi 12(\tau=0)$ while, at $\phi 12(\tau=\Delta\tau)$, there is no correlation and consequently no peak value. As a result of this, the difference between the two calculated values becomes of a large magnitude. On the other hand, if there is no difference between the calculated values, peak values will exist at $\phi 12(\tau=0)$ and $\phi 12(\tau=\Delta\tau)$. Hence, if a test paper currency 5 is being compared with a genuine paper currency 5a, a correlation at $\phi 12(\tau=\Delta\tau)$ will result in no output signal being delivered from subtracting device or discriminating device 13, and this will indicate that the test paper currency 5 is counterfeit.

From the foregoing description, it will be clear that the embodiment of the invention shown in FIG. 2 functions on the basis of determining correlation or lack of correlation between a signal function resulting from scanning of a test paper currency 5 and a signal function resulting from simultaneously and synchronously scanning a genuine paper current 5a. Even if a noise is mixed with a check signal from device 1, due to soiling or wear of the test paper currency 5, such noise has a very small magnitude compared to the magnitude of the irregularity of the signal function resulting from scanning of the test paper currency 5. Thus, the noise would result in only a slight decrease in the degree of correlation between the signal function from device 1 and the signal function from device 2. Stated another way, the influence of soil or wear on the test paper currency is greatly reduced, and the device of the invention is thus useful for determining genuineness of a paper currency 5 without fear of decrease in the discriminating ability due to soil or wear of the test paper currency.

As mentioned, the signals supplied to correlators 11 and 12 represent only the A.C. or fluctuating components of the light incident upon the photoelectric devices through the test paper currency and the genuine paper currency. These signals supplied to the correlators, because of their character, are such that they are not influenced by the absolute value of the light but only by the magnitude of the variation thereof with respect to the scanning time. Consequently, the device of FIG. 2 has a long period of use without being influenced to any appreciable extent by aging or other changes in light source 3, photoelectric elements 4, 4a and 4b, or other elements. Additionally, the light receiving surfaces of the photoelectric elements are covered by the cover plate 8 which has the relatively narrow slit 7 which is narrow in the direction of movement of the paper currency but relatively long transversely of the direction of movement. Consequently, slight lateral shifts or positional deviations in the lateral direction of the paper currencies 5 or 5a will have substantially no effect.

Figure 5:
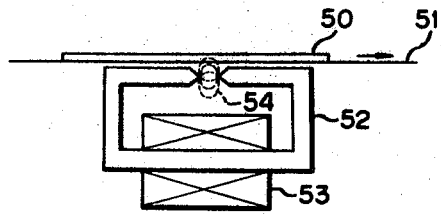
FIG. 5 is a somewhat schematic and diagrammatic illustration of another embodiment of the present invention.

In the embodiment of the invention shown in FIG. 5, scanning of the test paper currency or the like and of the genuine paper currency or the like is effected magnetically. Generally, high quality printing ink is used for paper currency, securities or the like, and ferromagnetic substances such as Fe, Ni, Co, Cr and the like are used for the pigment of the ink.

In FIG. 5, a test paper currency to be checked is indicated at 50 as supported on a base 51 for movement in the direction of the arrow by suitable means, which have not been illustrated but which may, for example, comprise feed rollers 2 such as shown in FIG. 2. An electromagnet is illustrated as including an iron core 52 and an energizing winding 53, the iron core 52 having an air gap with a magnetic flux field extending thereacross. The paper currency 50 is moved longitudinally of the base 51 so that it traverses the magnetic field 54 of the electromagnet. The variation in impedance of the electromagnet is derived as a check signal function for the paper currency 50.

FIG. 5 shows only the device for deriving a signal variable as a function of time with respect to test paper currency, but it should be understood that a similar device is provided for determining a signal variation with respect to time of a genuine paper currency, and corresponding, except for magnetic scanning rather than optical scanning, with the device 1a of FIG. 2. Also, these two magnetic scanning devices will have associated therewith the devices 9, 9a and 9b, the correlators 11 and 12, and the discriminator or subtracting device 13 as shown in FIG. 2, or equivalents of these elements. The main objective of the embodiment shown in FIG. 5 is to detect counterfeit paper currencies or counterfeit securities which are manufactured or produced by a special photographic technique and which cannot be readily detected by the optical means of the embodiment of FIG. 2. In the embodiment of FIG. 2, the check signal is derived through optical means associated with light sources, and an irregularily varying signal function is obtained in accordance with the relative transparence or translucence of the article or paper currency to be checked. Thus, variations in the relative lightness and darkness of the pattern of the matter to be checked are a large factor in determining the variation, with respect to scanning time, of the signal. The production of counterfeit matter having variations in lightness and darkness such as to produce the same signal output as produced by the genuine paper currency 5a is not impossible using special photographic techniques.

On the other hand, with the embodiment of FIG. 5 wherein the scanning is effected magnetically, a counterfeit paper currency, security or the like produced by a special photographic technique can be readily detected.

In both embodiments, either a specially made comparison article or a genuine paper currency may be used as the model signal generating article 5a for the device 1a. When using a specially made model article, instead of using electric circuits 9a, 9b, etc., which generate polarity signals corresponding to only the A.C. or fluctuating component of the output of the photo-electric elements, the model article can be such as to directly generate signals for application to the correlators 11 and 12. While paper currency has been specifically mentioned as the matter to be checked, it will be clearly apparent that the testing method and apparatus of the invention are not limited to paper currencies but may be applied to other articles such as, for example, securities such as bonds and shares, and the like.

The special features of the invention comprise the use of the correlators 11 and 12 as well as the provision of the covers 8, having the relatively long and relatively narrow slits 7, and which are used to mask the light receiving surfaces of the photoelectric elements. Furthermore, in both embodiments of the invention, a special check signal is produced, as by the scanning means, 4b of FIG. 2, and a similar magnetic scanning means, located in spaced relation to the scanning means shown in FIG. 5, can be provided in the embodiment of the invention shown in FIG. 5. The embodiment of the invention shown in FIG. 5 has all the advantages of the embodiment of the invention shown in FIG. 2, and which have been enumerated above. It furthermore has the additional advantage that it is able to detect counterfeits formed by a special photographic technique, and which cannot be readily detected by the embodiment of the invention shown in FIG. 2.

What is claimed is:

1. A method of testing whether a test article, having printing distributed in a predetermined pattern therealong is genuine or is counterfeit, comprising the steps of: longitudinally scanning the test article to detect first variations in the printing pattern of the test article as a function of the scanning time; simultaneously and in synchronism with the scanning of the test article, longitudinally scanning a model article, having printing distributed in a genuine predetermined pattern therealong, to detect second variations in the printing pattern of the genuine article as a function of the same scanning time; and deriving the correlation function of said first and second variations to determine whether the same correspond, to indicate that the test article is genuine, or are disparate, to indicate that the test article is counterfeit.

2. A method as claimed in claim 1, including the step of converting each of said first and second variations into a corresponding respective electric signal varying as a function of the scanning time, before the correlation function deriving step.

3. A method as claimed in claim 2, in which the respective scanning steps are effected by directing light upon the test article and the model article and detecting variations in the amount of light transmitted through the test article and the amount of light transmitted through the model article; the variations in the transmitted light being electro-optically converted into such respective corresponding electric signals varying in magnitude as a function of the scanning time.

4. A method as claimed in claim 2, in which the printing of said test article and said model article is effected in magnetic ink; the scanning of the test article and of the model article being effected by passing the test article and the model article through respective magnetic fields each forming part of a respective magnetic circuit, and converting variations in the reluctance of the respective magnetic circuits into corresponding electrical signals.

5. A method as claimed in claim 1, in which said correlation function deriving step is effected by detecting the magnitude of said first variation at a first predetermined instant of the scanning time to obtain a first value, detecting the magnitude of said second variation at said first predetermined instant of the scanning time to obtain a second value, detecting the magnitude of said second variation at a different predetermined instant of the scanning time to obtain a third value, combining the first and second values to obtain a first magnitude signal, combining the first and third values to obtain a second magnitude signal, and determining the order of the difference between said first and second magnitude signals as an indication of whether or not said test article is genuine.

6. Apparatus for testing whether a test article, having printing distributed in a predetermined pattern therealong, is genuine or is counterfeit, said apparatus comprising, in combination, first scanning means operable to scan the test article to detect variations in the printed pattern of the test article and to convert the variations into a first output signal varying as a function of the scanning time; second scanning means operable, simultaneously and in synchronism with the first scanning means, to scan a model article, having printing distributed in a genuine predetermined pattern therealong, to detect variations in the printing pattern of model article and to convert the variations into an output signal varying as a function of the same scanning time; correlation function deriving means connected to said first and second scanning means and operable to derive the correlation function of said first and second output signals; and comparison means connected to said correlation function deriving means and operable to determine whether said first and second output signals correspond, to indicate that the test article is genuine, or are disparate, to indicate that the article is counterfeit.

7. Apparatus as claimed in claim 6, in which each of said scanning means includes a respective photoelectric scanning element, each scanning element being located at the same point along the respective path of travel of the associated article through the respective scanning means.

8. Apparatus as claimed in claim 6, in which the printing of said articles is effected in magnetic ink; each of each scanning means including a respective magnetic pickup located at the same point along the respective path of travel of the associated article through the respective scaning means.

9. Apparatus as claimed in claim 6, in which said first scanning means includes a first scanning element positioned at a first predetermined point along the path of travel of the test article through said first scanning means; said second scanning means including a second scanning element positioned at an identical point along the path of travel of the model article through said second scanning means, and a third scanning element positioned at a different point along the path of travel of the model article through said second scanning means; said correlation function deriving means including a first correlator connected to the outputs of said first and second scanning elements and a second correlator connected to the outputs of said first and third scanning elements; said comparison means comprising a comparing device connected to the outputs of said first and second correlators and operable to provide an output signal, indicative of genuineness of the test article, when the difference between the outputs of said first and second correlators is of the order of a first relatively large magnitude; said comparing device producing no output signal when the difference between the magnitudes of the outputs of said first and second correlators is less than a predetermined minimum value.

10. Apparatus as claimed in claim 7, in which each of said scanning means includes a light source disposed adjacent one surface of the article to be scanned; each of said photoelectric scanning elements being disposed adjacent the opposite surface of the article to be scanned, and each having a light receiving surface; a respective cover positioned over each light receiving surface and formed with a relatively elongated and relatively narrow slit therethrough extending transversely of the path of travel of the respective article through the respective scanning means.

11. Apparatus as claimed in claim 7, including a respective light source in each scanning means positioned adjacent one surface of the article to be scanned therein; said scanning elements being positioned adjacent the opposite surface of the respective article to be scanned; said scanning elements including a first photoelectric element positioned at a preselected point along the path of travel of said test article through said first scanning means, and a second photoelectric element positioned at the same predetermined point along the path of travel of the model article through said second scanning means; a third photoelectric element positioned at a different point along the path of travel of said model article through said second scanning means; a plurality of converter means each connected to the output of a respective photoelectric element and operable to provide a converter output which is an electrical signal varying as a function of time and corresponding only to the fluctuating portion of light received by the associated photoelectric element; said converter elements connected respectively to the outputs of said first, second and third photoelectric elements; said correlation function deriving means indicating a first correlator connected to the output of said first and second converter elements and a second correlator connected to the outputs of said first and third converter elements; said correlators providing output signals corresponding to the sum of the input signals thereto; said comparison means comprising a comparing element connected to the outputs of said first and second correlators and providing a comparison output signal when the difference between the magnitudes of the outputs of said first and second correlators is of the order of a preset relatively large value, to indicate that the test article is genuine; said comparing element being effective to provide no comparison output signal when the difference between the magnitudes of the outputs of said first and second correlators is less than the predetermined minimum value.

References Cited

UNITED STATES PATENTS

| | | | |
|---|---|---|---|
| 3,246,297 | 4/1966 | Silversteins et al. | 250—219 |
| 3,339,076 | 8/1967 | Hilal | 250—219 |

RALPH G. NILSON, Primary Examiner

MARTIN ABRAMSON, Assistant Examiner

U.S. Cl. X.R.

235—181; 356—168